United States Patent [19]

Meyer

[11] 4,075,394

[45] Feb. 21, 1978

[54] PROCESS OF INHIBITING TANNIN MIGRATION IN TANNIN-CONTAINING WOOD SUBSTRATES

[75] Inventor: Victor E. Meyer, Midland, Mich.

[73] Assignee: The Dow Chemical Company, Midland, Mich.

[21] Appl. No.: 674,789

[22] Filed: Apr. 8, 1976

[51] Int. Cl.$^2$ .................. B05D 7/06; B32B 21/08
[52] U.S. Cl. ........................ 428/537; 260/2 EN; 428/541
[58] Field of Search .............. 428/537, 540, 541; 260/2 EN

[56] References Cited

U.S. PATENT DOCUMENTS

| | | | |
|---|---|---|---|
| 3,345,203 | 10/1967 | Kine et al. | 428/537 X |
| 3,565,679 | 2/1971 | Strother | 428/541 X |

Primary Examiner—James R. Hoffman
Attorney, Agent, or Firm—G. R. Plotecher

[57] ABSTRACT

Tannin migration in tannin-containing wood substrates, such as redwood and cedar, is inhibited by treating said substrate with an aqueous solution of polyalkylenimine, such as polyethylenimine.

8 Claims, No Drawings

PROCESS OF INHIBITING TANNIN MIGRATION IN TANNIN-CONTAINING WOOD SUBSTRATES

BACKGROUND OF THE INVENTION

1. Field of Invention

This invention relates to a process of treating tannin-containing wood substrates with an aqueous solution of a polyalkylenimine and to the resulting polyalkylenimine-treated substrates.

2. Description of the Prior Art

Although various processes of inhibiting tannin migration in tannin-containing wood substrates are known, none use or suggest the use of an aqueous polyalkylenimine solution. For example, Lalk et al. U.S. Pat. No. 3,900,619 teach the application to such substrates of a water-soluble S-aryl cycloaliphatic sulfonium compound. Harren et al. U.S. Pat. No. 3,494,878 teach incorporating an ion exchange resin into an aqueous coating composition comprised of a dispersed emulsion polymer of vinyl addition type and applying same to cedar and redwood type substrates. The ion exchange resin must be highly cross-linked to prevent its leaching from the substrate.

Dickson et al. U.S. Pat. No. 3,313,736 teach many and varied uses of polyalkylenimines, among which include dyeing assistance and dye fixing. Krallmann et al. Fr. Pat. No. 1,498,727 also teach dye fixing (in fibrous material, such as cotton) with a polyalkylenimine. However, these and other polyalkylenimine references do not address the problem of tannin migration in tannin-containing wood substrates and are thus silent thereon.

SUMMARY OF THE INVENTION

A novel process of inhibiting tannin migration in a tannin-containing wood substrate is herein disclosed comprising applying to the wood substrate an aqueous solution of a polyalkylenimine. The polyalkylenimine-treated substrates also exhibit enhanced color and maintain same for extended periods as compared to similar, but untreated, substrates. Moreover, said treated substrates resist staining of coating films, such as latex paint, applied thereto.

DETAILED DESCRIPTION OF THE INVENTION

The polyalkylenimines here used are polymers having the repeating unit

(I)

wherein R, R′ and R″ are hydrogen, hydrocarbyl or inertly-substituted hydrocarbyl. Typical hydrocarbyls include alkyl, cycloalkyl, aryl, aralkyl and the like. By "inertly-substituted hydrocarbyl" is meant hydrocarbyls having substituents, such as halogen, carbonyl, etc., that are inert to the polyalkylenimine's tannin migration inhibition ability. Polyalkylenimines wherein R, R′ and R″ are lower alkyl (1–4 carbon atoms), such as polypropylenimine and polybutylenimine, are preferred. The polyalkylenimine wherein R, R′ and R″ are hydrogen, i.e., polyethylenimine, is especially preferred.

Polyalkylenimines of various molecular weight can be used in the practice of this invention. Typically, the polyalkylenimines here used have an average minimum molecular weight of about 800 and preferably about 20,000. Practical considerations, such as solubility, mechanical application, and the like, are the only limitations upon the polyalkylenimine's average maximum molecular weight although convenience prefers a maximum of about 200,000.

In the practice of this invention, one or more water-soluble polymers of Formula I are dissolved in an aqueous medium and the resulting solution is applied to the tannin-containing wood substrate. The aqueous medium can be water per se or it can be an aqueous solution or dispersion comprising other materials, such as pigments and sealers. The aqueous polyalkylenimine solution can be applied to said substrate by any conventional means, i.e., brushing, rolling, spraying, dipping, an impregnating process and the like.

The polyalkylenimine concentration in the solution and the amount of solution applied to the tannin-containing wood substrate can vary widely, depending upon the type of wood to be treated and the degree of tannin migration inhibition desired. A polyalkylenimine concentration of at least about 2 percent, and preferably of about 5 percent, is generally satisfactory. Typically, a maximum polyalkylenimine concentration of about 50 weight percent, and preferably of about 10 weight percent, is used in deference to economic considerations. The aqueous polyalkylenimine-containing solution is applied to the wood substrate in an amount sufficient to thoroughly wet the surface of said substrate.

Although not preferred, the polyalkylenimine can be cross-linked by any suitable cross-linking material. Such material includes formaldehyde, paraformaldehyde and formaldehyde-type resins, such as urea-formaldehyde and melamine-formehyde resins. Typically the cross-linking material is applied to a wood substrate subsequent to the application of the polyalkylenimine and before the polyalkylenimine application has dried, but the cross-linking material can also be mixed with the polyalkylenimine solution prior to the solution's application to the wood substrate. This latter technique, however, generally requires immediate application of the solution to the wood substrate to avoid reaction between the polyalkylenimine and cross-linking material prior to application. It has been found that cross-linking the polyalkylenimine does not improve its ability to inhibit tannin migration and, in some cases, it detracts therefrom.

By the term "tannin-containing wood substrate" is intended to include wood, wood composites and wood-derived products containing water-soluble tannins. Any wood substrate capable of receiving an application of an aqueous polyalkylenimine can be used in the practice of this invention. Typical examples include: wood, such as redwood and cedar; wood composites, such as particle and fiberboard and plywood; and wood-derived products, such as veneer and paper.

The following examples are illustrative of certain specific embodiments of the invention. Unless otherwise noted, all parts and percentages are by weight.

SPECIFIC EMBODIMENTS

Redwood siding lumber was used as the tannin-containing wood substrate. Since tannin migration varies from sample board to sample board, comparative tests were usually made on samples of the same board.

EXAMPLE 1

Color Enhancement

Aqueous solutions of PEI 6, PEI 18 and PEI 400 were prepared at 2 percent, 5 percent and 10 percent concentrations. PEI 6, 18 and 400 correspond to polyethylenimine of average molecular weights 600, 1,800 and 40,000 respectively. Each solution was brushed onto an individual redwood sample, with the grain, in an amount sufficient to thoroughly wet the brushed area. A portion of each sample board was not treated so as to serve as a control area. The treated sample boards were allowed to dry for one day and then visually inspected. The treated areas exhibited enhanced color (a deeper red color) than did the non-treated areas. Likewise, the areas treated with a greater concentration of polyethylenimine exhibited a deeper red color than those areas treated with a lesser concentration. However, the difference in color intensity between the 2 percent and 5 percent concentrations was greater than between the 5 percent and 10 percent concentrations.

EXAMPLE 2

Leach Inhibition

Using the procedures of Example 1, redwood samples were treated with PEI 6, 18 and 400 at a 2 percent concentration. Formaldehyde was applied to a portion of the brushed area on each sample to cross-link the polyethylenimine. The samples were allowed to dry for one day. Upon visual inspection, each sample showed similar results as those reported above. The samples were then placed in an Atlas Weather-O-Meter$^R$, Model XW-R for 70 operating hours (constant light supplied by a carbon-arc lamp; 2-hour cycles of 18 continuous minutes direct water spray at 102-minute intervals; 70°–75° F) and subsequently visually inspected. PEI 6 failed to inhibit tannin migration (leaching) regardless of cross-linking. PEI 18 showed some tannin inhibition while PEI 400 showed good inhibition of tannin migration. In each case, the uncross-linked polyethylenimine performed superior to the cross-linked polyethylenimine.

EXAMPLE 3

Leach Inhibition

A 2 percent PEI 1000 solution was brushed upon one area of a redwood board. To a second area of the same redwood board was brushed a 2 percent PEI 1000 solution to which 0.2 percent formaldehyde (based on PEI 1000 solids) had been added. A third area of the same redwood board served as a control.

After the redwood board had dried, a portion of each area thereof was covered by brush with an exterior acrylic white paint manufactured by the General Paint and Chemical Company under the tradename Tru-Test K65. A portion of the painted parts of each area received a second covering of the same paint (after the first covering had dried, of course). The redwood board was then aged, initially in a tropical chamber (90 percent relative humidity/90° F) for several days, and then at laboratory conditions (ambient humidity and temperature) for 13 months.

Subsequent visual inspection revealed that both the PEI 1000 and the PEI 1000/formaldehyde-treated areas exhibited an enhanced color that was not exhibited by the non-treated area. Both (single and double) paint coverings on the control area exhibited severe staining while the single paint covering on the two treated areas exhibited only minor staining and the double paint covering on same exhibited still less. Both paint coverings on the PEI 1000/formaldehyde-treated area were visibly more stained than the corresponding PEI 1000-treated areas.

What is claimed is:

1. A process of inhibiting tannin migration in a tannin-containing wood substrate comprising applying to the wood substrate an aqueous solution consisting essentially of between about 2 and about 50 weight percent polyalkylenimine.

2. The process of claim 1 wherein the polyalkylenimine is a polymer having the repeating unit

wherein R, R' and R" are hydrogen or an alkyl of 1 to 4 carbon atoms.

3. The process of claim 1 wherein the polyalkylenimine is polyethylenimine.

4. The process of claim 3 wherein the polyethylenimine has an average molecular weight between about 20,000 and about 200,000.

5. The process of claim 4 wherein the aqueous solution contains between about 5 and about 10 weight percent polyethylenimine.

6. The process of claim 5 wherein the wood substrate is redwood or cedar.

7. A tannin-containing wood substrate treated by the process of claim 1.

8. Redwood treated by the process of claim 1.

* * * * *